Figure 1:
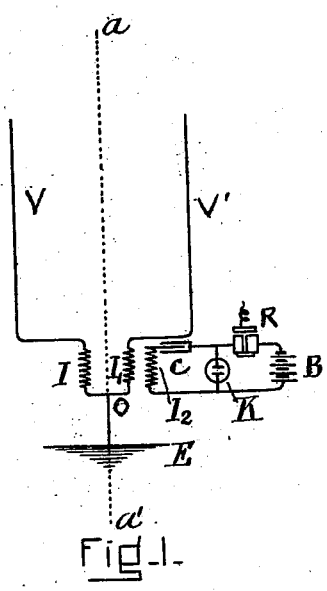

No. 716,135. Patented Dec. 16, 1902.

J. S. STONE.

APPARATUS FOR DETERMINING THE DIRECTION OF SPACE TELEGRAPH SIGNALS.

(Application filed Jan. 23, 1901.)

(No Model.)

WITNESSES:
Ellen B. Tomlinson
Philip J. Doherty

INVENTOR:
John Stone Stone
by Alex P. Browne
attorney

UNITED STATES PATENT OFFICE.

JOHN STONE STONE, OF BOSTON, MASSACHUSETTS, ASSIGNOR TO LOUIS E. WHICHER, ALEXANDER P. BROWNE, AND BRAINERD T. JUDKINS, TRUSTEES.

APPARATUS FOR DETERMINING THE DIRECTION OF SPACE-TELEGRAPH SIGNALS.

SPECIFICATION forming part of Letters Patent No. 716,135, dated December 16, 1902.

Application filed January 23, 1901. Serial No. 44,386. (No model.)

*To all whom it may concern:*

Be it known that I, JOHN STONE STONE, a citizen of the United States, residing at Boston, in the county of Suffolk and State of Massachusetts, have invented certain new and useful Improvements in Apparatus for Determining the Direction of Space-Telegraph Signals, of which the following is a specification.

The invention relates to the art of signaling electrically between stations not connected by a conducting-wire, and more particularly to the system of such signaling in which the signals are transmitted by means of unguided electromagnetic waves emanating from elevated conductors.

Systems of signaling electrically between stations not connected by a conducting-wire have been termed by some "systems of space telegraphy," and I shall hereinafter so designate them. The particular system of space telegraphy in which the electromagnetic waves emanate from elevated conductors and in which the waves are developed by producing electric vibrations in said elevated conductors shall hereinafter for convenience be referred to as the "elevated-conductor system of space telegraphy."

Heretofore, so far as I am aware, it has been impracticable in the elevated-conductor system of space telegraphy to determine at the receiving-station the bearing of the transmitting-station by observing the direction of motion of the electromagnetic signal-waves at the receiving-station.

The object of the present invention is to supply apparatus whereby in an elevated-conductor system of space telegraphy the bearing or direction of the transmitting-station from the receiving-station may be determined by observing at the receiving-station the direction of motion of the electromagnetic waves which emanate from the transmitting-station.

By enabling an operator at a receiving-station to accurately determine the bearings of the transmitting-station from which signals are being received the present invention greatly enhances the value of the elevated-conductor system of space telegraphy, and more particularly in its application to the art or science of navigation.

By this invention ships may be equipped with apparatus whereby the ships when approaching each other at sea may receive warning of their proximity to one another, and each ship may determine the bearing of the other, as well as such other information as they may wish to communicate—as, for example, the course steered and the speed. These signals are not interfered with by climatic conditions, which render quite useless or even misleading the signals at present most commonly employed by navigators. Moreover, by this invention ships and shore-stations may be equipped with apparatus whereby the ships when approaching land may receive warning of their proximity to the shore-stations, may communicate with the shore-station, and may determine the identity and bearing of the latter, and thereby accurately deduce their position on the chart, even under such unfavorable conditions of weather as would render light invisible and fog-signals useless or misleading.

For the purpose of determining the direction of a train of electromagnetic waves I receive the energy of the waves in several conductors, which may or may not be so connected as to form parts of a closed network. The energy of the electromagnetic waves manifests itself in these conductors by electric oscillations. I convey these oscillations to a suitable electric translating device and change the position of the several conductors relative to the direction of motion of the electromagnetic waves till a position is found at which the combined effect upon the translating device of the several oscillations is *nil*.

Before proceeding to a description in detail of the apparatus employed it is best to describe some of the facts upon which the operation of the invention depends.

In an elevated-conductor system of space telegraphy the electromagnetic signal-waves emanating from the elevated conductor at the transmitting-station spread out in concentric circles with a velocity of $3 \times 10^{10}$ centimeters per second. If, therefore, for example, the frequency of the vibrations be $2 \times 10^7$ per second, the length of the waves will be fifteen hundred centimeters, and two similar elevated conductors placed seven hundred and fifty centimeters apart and in the line of motion of the electromagnetic waves will receive the waves at a difference of phase of half a period, or one hundred and eighty degrees. If the waves be symmetrical—as, for example, if they be simple harmonic in character or of the form $A_1 \sin. pt + A_3 \sin. _3 pt + A_5 \sin. 5 pt$—the electric oscillations developed in the two vertical wires will be substantially equal and opposite in sign, and if these oscillations be conveyed to a common electric translating device they will neutralize each other's effects and will not operate the translating device. If, however, the two elevated conductors described above be moved out of the line of motion of the electromagnetic waves though still retaining their separation of seven hundred and fifty centimeters, the electric oscillations induced in them will not be equal and opposite, and their combined action upon the common electric translating device will not be *nil*. There is therefore for these two elevated conductors but one position relative to the direction of motion of the electromagnetic waves at which the electric oscillations induced in them are equal and opposite in phase and at which the common translating device will not be operated. Again, if the two similar elevated conductors be separated by any distance less than half the wave length of the electromagnetic waves careful consideration will show that there is no position in which the electrical oscillations induced in the two conductors will be both equal and opposite; but it is a fact that if the two similar vertical conductors be placed in a plane normal to the direction of motion of the electromagnetic waves the electric oscillations induced in them will be equal and in the same phase. In order that the combined effect of the oscillations from the two similar elevated conductors upon the electric translating device shall be *nil* when the two conductors are in a plane normal to the direction of motion of the electromagnetic waves, certain devices may be employed, which will hereinafter be described. By such devices the phases of the electric oscillation induced in the two elevated conductors are separated by one hundred and eighty degrees before the oscillations are conveyed to the electric translating device, or the equivalent of this is accomplished.

Embodiment of the foregoing principles in a device to determine the direction of motion of a train of electromagnetic waves may be best understood if we have reference to the accompanying drawings.

Figures 1, 2, 3, and 4 are diagrams illustrating four different arrangements of the apparatus at the receiving-station.

In the drawings the same letters refer to similar parts of the apparatus.

V and V' are vertically-elevated conductors.

I and I' are the two arms of an induction-balance, to be hereinafter more fully described.

$I^2$ is the third element of the above-mentioned induction-balance.

C and C' are condensers.

K is a coherer.

B is a battery.

R is a relay.

E is an earth connection.

In the figures the two vertical wires V and V' are separated by a distance less than the wave length of the electromagnetic wave-signal, the energy of which they are intended to receive, and they are moreover so arranged that they may be rotated about the vertical axis $a\ a'$.

Figure 2:
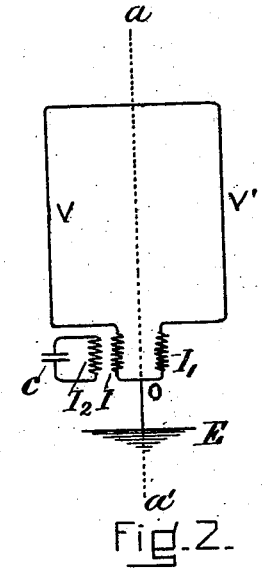
Figure 3:
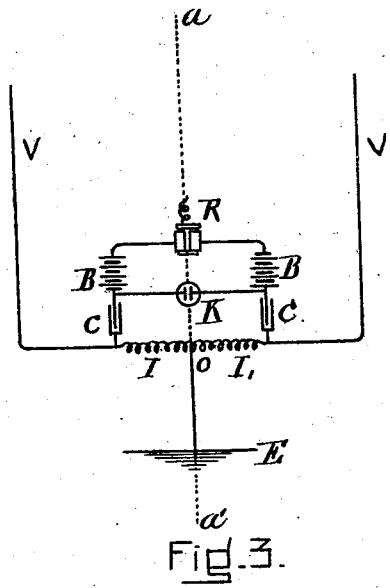
Figure 4:
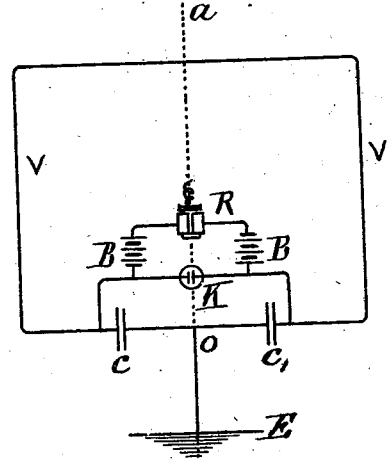

The devices designated by I, I', and $I^2$ in Figs. 1 and 2, by I, I', and the bridging-circuit C K in Fig. 3, and by C, C', and K in Fig. 4 are well-known forms of induction-balances, of which the branch O E and the branch or circuit including the receiver are rendered conjugate. The manner in which the induction-balances in these figures are constructed and adjusted is well known, but for perspicuity shall be outlined here. The coils I and I' in Figs. 1 and 2 are spiraled in opposite directions and are constructed with an equal number of turns in each helix, provided the electrical constants of the two vertical wires or the electrical constants of the two vertical parts of the elevated conductors are equal. The coil $I^2$ is so placed symmetrically relative to the coil I and I' that the mutual inductances between it and the other two coils are equal.

In Fig. 3, I and I' are constructed with equal resistances or inductances if the electromagnetic constants of the two vertical conductors are equal, and in Fig. 4, C and C' are condensers of equal capacities. The induction-balances are so adjusted that the branch O E and the branch containing the coherer K are conjugate, and the electromagnetic constants of the two vertical conductors V V' being equal, no electromotive force will be developed in the branch containing the coherer, when the oscillatory electromotive forces induced in the two vertical wires are equal in phase and amplitude, whereas if, on the contrary, the oscillatory electromotive forces induced in the vertical conductors differ in phase or amplitude, or both, oscillatory electromotive forces will thereby be developed in the branch containing the coherer.

Considering now specifically the induction-balance shown in Figs. 1 and 2 of the drawings, we find that if two similar wires V V' are in a plane normal to the direction of motion of the waves equal potentials will be imparted to the two conductors, and since the two coils I and I' are also similar the conductors V I E and V I' E will have equal potentials imparted to them and similar currents developed in them; but the coils I and I' are so wound and connected as to oppose each other in their effect upon $I^2$, and since $I^2$ is symmetrically placed with respect to I and I' the effect of these two coils upon I² will be nil. This is easily seen to be the case as regards the magnetic induction, and careful consideration will show that with the symmetrical disposition of the coil I² relative to I and I' the latter may be so connected to their respective vertical conductors and the earth that the potentials in I and I' may not produce differences of potential, and therefore currents in the coil I², but at most merely a fluctuation of the potential of the system I² R B K as a whole, which can have no effect upon the receiving device. Again, when the electric induction is permitted to produce differences of potential in the coil I² the terminals of that coil may always be taken at a point where the induced potentials balance. So far we have considered the case of a balance in Figs. 1 and 2.

In the case of a balance in Fig. 3 the potentials imparted to the conductors V V' are equal and since the coils I and I¹ have equal inductances and resistances and the condensers C and C' are of equal capacity the only result of the potentials imparted to the vertical conductors V V' is to vary the potential of the receiving device and its circuit K B R as a whole. Similarly when equal potentials are imparted to the two elevated conductors in Fig. 4 the result is merely to change the potential of the circuit K B R as a whole.

Mere changes of potential of the receiver-circuit without the production of differences of potential, and consequently without the production of currents in the receiver-circuit, cannot operate the receiver.

From what has hereinbefore been said it will be apparent that if the elevated systems be so rotated about the vertical axis $a$ $a'$ that the two vertical wires V V' are in a plane normal to the direction of motion of the electromagnetic field the oscillatory electromotive forces induced in the vertical conductors V V' will be equal both in phase and amplitude, and therefore the coherer-circuit will have no oscillations developed in it and the coherer K will not be operated, whereas if the two vertical conductors be rotated to any other position relative to the direction of motion of the electromagnetic field, the oscillatory electromotive forces induced in the two vertical conductors will differ in phase, and oscillatory electromotive forces will be developed in the coherer-circuit, due to the difference between the two oscillations in the two vertical wires, and these oscillations will operate the coherer, which in turn operates the relay R in the usual manner. In the method of space telegraphy most commonly employed at present the operation of the relay R sets in motion what is termed a "decoherer," which tends to restore the coherer to its normal condition of high resistance. Such usual parts of the apparatus are not shown in the drawings, but may be employed in connection with the apparatus there shown and in the usual way. I may, however, employ any suitable electric translating device—such, for instance, as a static telephone-receiver—in place of the coherer, as shown in Fig. 2, where C represents a condenser-telephone. The branch of the induction-balance which contains the coherer, telephone, or other translating device I shall designate for convenience as the "telephone branch."

In determining the direction of motion of the electromagnetic field by my apparatus the position of the vertical conductors relative to the direction of motion of the electromagnetic waves is altered till a position is found at which the electromagnetic field fails to develop electric oscillations in the receiver-circuit. When this position is found, the direction of motion of the electromagnetic waves is determined by the principles hereinbefore given. I need, obviously, not limit myself to two vertical conductors, but may employ any number of conductors greater than one and may group and connect them in a variety of ways.

What I claim as my invention is—

1. A system of space telegraphy comprising a source of electromagnetic waves, a system of elevated conductors capable of receiving the energy of these waves, and also capable of having their position changed relatively to the direction of motion of the electromagnetic waves, an induction-balance connected with the system of elevated conductors and an electric receiving device in the telephone branch of said induction-balance.

2. A system of space telegraphy comprising a source of electromagnetic waves, a system of elevated conductors capable of receiving the energy of these waves and also capable of having their position changed relatively to the direction of motion of the electromagnetic waves, an electric translating device associated with the system of elevated conductors, and means whereby said translating device may indicate a signal only when the said system of electrical conductors has a predetermined position relative to the direction of said electromagnetic waves.

JOHN STONE STONE.

In presence of—
  ALEX. P. BROWNE,
  ELLEN B. TOMLINSON.